Aug. 4, 1931.  D. R. GARRETSON  1,817,361
BRUSH RAKE
Filed Jan. 5, 1928    2 Sheets-Sheet 1

Inventor
D. R. Garretson.
by Hazard and Miller
Attorneys

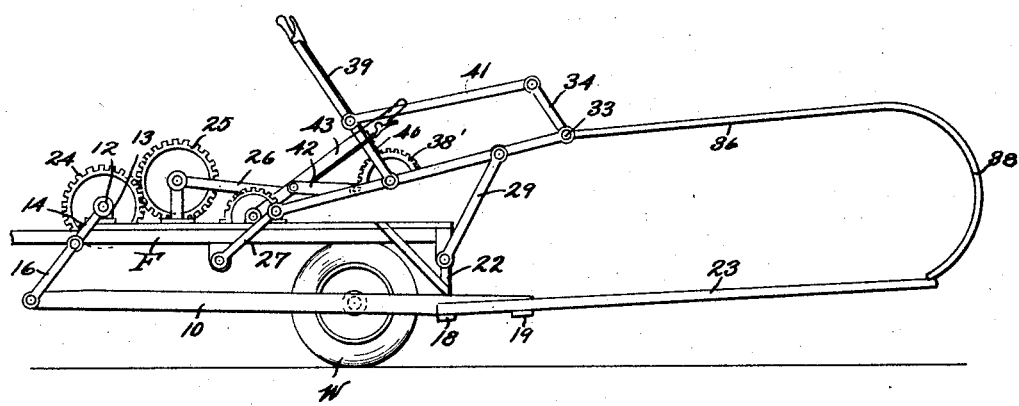
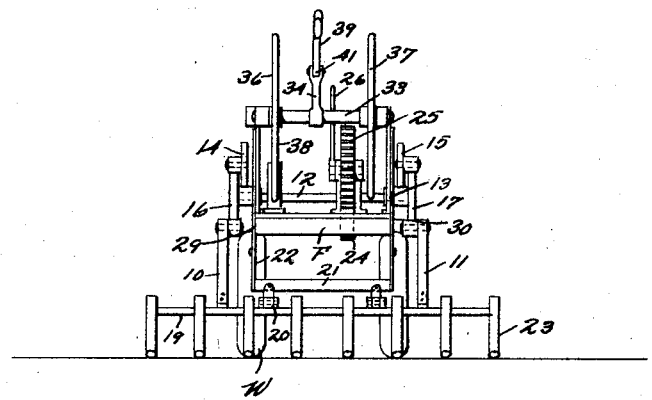

Patented Aug. 4, 1931

1,817,361

UNITED STATES PATENT OFFICE

DAVIS R. GARRETSON, OF WHITTIER, CALIFORNIA

BRUSH RAKE

Application filed January 5, 1928. Serial No. 244,616.

This invention relates to improvements in brush rakes.

An object of the invention is to provide a brush rake which is somewhat similar in construction to buck rakes used in hay, and which consists essentially in a wheeled vehicle which carries a plurality of parallel preferably pointed arms adapted to be thrust into a pile or winrow of brush, hay or the like, and to carry it.

Another object of the invention is to provide a brush rake having the above mentioned characteristics, and which has in addition thereto, gathering means which will tend to gather the brush or hay onto the supporting arms and to hold it thereon so that the brush or hay will not drop off of the supporting arms while being transported from place to place.

A further object of the invention is to provide a brush rake of such a construction as to be capable of being installed upon a truck chassis, and having the parts so arranged that the mechanism may be operated from the driver's seat of the truck.

With the foregoing and other objects in view which will be made manifest in the following detailed description and specifically pointed out in the appended claims, reference is had to the accompanying drawings for an illustrative embodiment of the invention, wherein:

Fig. 3 is a view similar to Figure 1, illustrating the brush rake in that position, wherein the brush or hay is being transported.

Fig. 4 is a view in elevation taken in the direction of the arrow 4 upon Figure 1.

Figure 1:
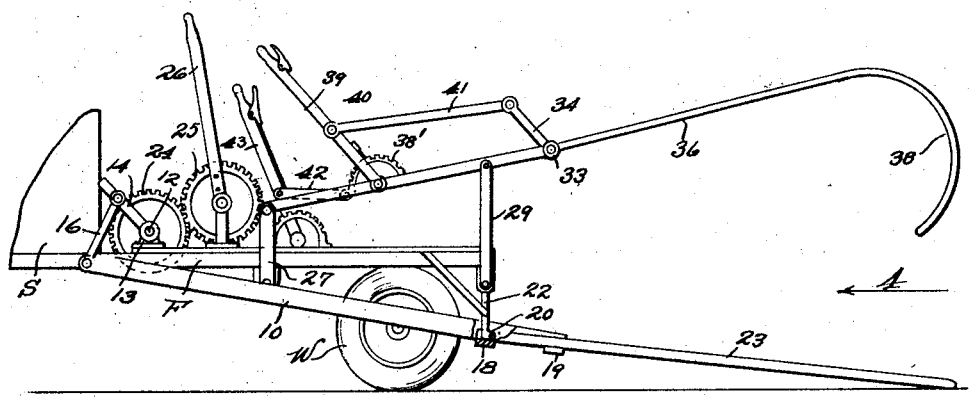
Figure 1 is a partial view of a truck showing the improved brush rake installed thereon, the brush rake being shown in elevation and in the position preparatory to being thrust into a pile or winrow of brush or hay.
Figure 2:
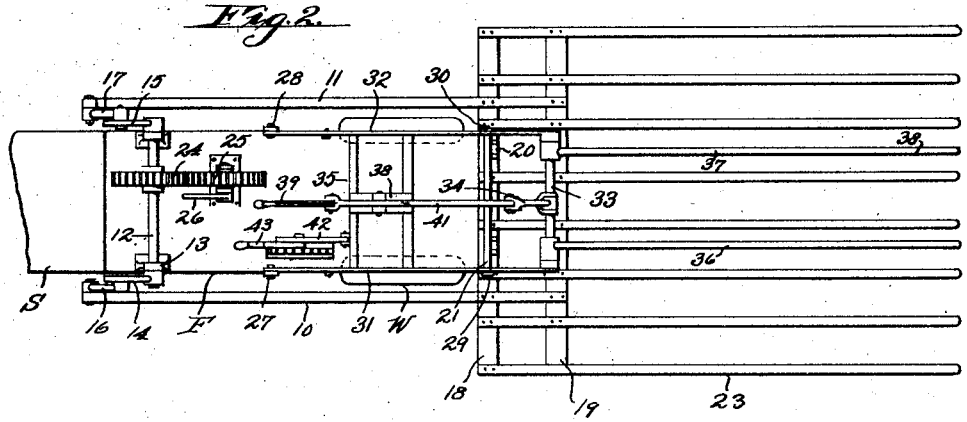
Fig. 2 is a top plan view of the same.

Referring to the accompanying drawings wherein similar reference characters designate similar parts throughout, the improved brush rake is adapted to be installed upon a truck chassis, the rear wheels of which are indicated at W, and the frame being indicated at F, on which there may be a driver's seat S. A supporting frame is provided, consisting of two parallel bars 10 and 11 arranged on opposite sides of the frame F and extending rearwardly therefrom. Adjacent the forward ends of these bars a transverse shaft 12 is rotatably mounted in bearings 13 on the frame. On the ends of the shaft there are cranks or arms 14 and 15 to which links 16 and 17 are pivotally connected. The links 16 and 17 are also pivotally connected to the longitudinal bars 10 and 11. The rear ends of the two bars 10 and 11 are connected by two cross bars 18 and 19, and the cross bar 18 is hingedly connected as by hinges 20 to a cross bar 21 suspended between uprights 22 mounted on the frame. A series of parallel equally spaced supporting bars 23 are provided which have their outer ends preferably pointed to facilitate their being thrust into a pile of brush and hay. These bars have their forward or inner ends rigidly fastened to the two cross bars 18 and 19. On the shaft 12 there is a gear 24 meshing with a gear 25 which is rotatably mounted upon the frame F. The gear 25 is adapted to be rotated by means of a handle or lever 26, and when it is rotated the supporting bars 23 can be caused to assume a downwardly and rearwardly inclined position as shown in Figure 1, or an approximately horizontal position as shown in Figure 3. When in the horizontal position the cranks 14 and 15 will have swung beyond the position a short distance, wherein they were in alignment with the links 16 and 17 as shown upon Figure 3, and the upward push on the links exerted by the weight of the brush on the bars 23 tends to continue the rotation of the gears 24 and 25 so that the handle or lever 26 is swung into engagement with the frame F, thus locking the gear 25 against further rotation and causing the bars 23 to support the brush.

It will be understood that the construction above described is adapted to be backed into a pile of brush or hay so as to be self-loading to a certain extent. A novel construction is provided for assisting in the loading and for maintaining the load on the supporting bars 23. This construction consists of two forward links 27 and 28 which are pivoted to the frame F and extend upwardly therefrom. A pair of rear links 29 and 30 which are somewhat longer than the forward links, are also pivoted to the frame. A pair of parallel bars 31 and 32 constituting a hold down bar or gathering arm supporting have their forward ends pivotally connected to the forward links 27 and 28 and are also pivotally connected to the links 29 and 30. These bars have their rear ends connected by means of a transverse shaft 33 on which there is rigidly fastened a crank or arm 34. The parallel bars 31 and 32, together with the transverse shaft 33 and one or more transverse braces 35, constitute a frame for the gathering mechanism which is movably mounted by means of the links 27, 28, 29 and 30 upon the frame F. Rigidly mounted upon the shaft 33 adjacent the ends thereof, there are two gathering arms or hold down bars indicated at 36 and 37. These gathering arms or bars have their rear ends curved downwardly as indicated at 38 so that they are somewhat hook-shaped in form. They are approximately of the same length as the length of the supporting bars 23. On the brace 35 there is mounted a ratchet segment or quadrant indicated at 38', and pivoted upon this ratchet, quadrant or segment is a hand lever 39 carrying a pawl 40 adapted to engage the teeth on the quadrant 38 so that it may be locked in any adjusted position. A link 41 is pivotally connected to the lever and to the crank 34 so that upon swinging the lever 39 the crank 34 can be actuated, thereby causing the shaft 33 to rotate and to raise or lower the hook-shaped gathering arms 36 and 37. A link 42 is pivotally connected to the quadrant 38 and is also pivotally connected to a hand lever 43 which is pivotally mounted upon a ratchet, segment or quadrant 44 mounted on the frame F. This hand lever also is provided with a pawl adapted to engage the segment or quadrant 44 to lock the hand lever 43 in any adjusted position. It will be understood that when the hand lever 43 is locked, that by virtue of the fact that it is connected to the hold down bar or gathering arm support provided by the parallel bars 31 and 32, that the frame can not be moved in either direction upon the links 27, 28, 29 and 30.

The operation of the improved brush gathering device is as follows:

The wheeled vehicle is backed up toward a pile or winrow of brush or hay, with the brush rake in the position shown in Figure 1. In this position the outer pointed ends of the supporting bars 23 are approximately resting on the ground so as to be capable of being thrust beneath the pile or winrow of brush or hay. When the supporting bars have been thrust beneath the pile as far as possible, the operator then grasps the two hand levers 43 and 39, disengaging their respective pawls from their respective ratchet segments or quadrants. The hand lever 39 is first held against rotational movement, but the hand lever 43 is forced rearwardly, causing the hold down bar or gathering arm support provided by the parallel bars 31 and 32 to be moved rearwardly, carrying with it the gathering bars or arms 36 and 37. When in its rearmost position, the hand lever 39 can be moved rearwardly, allowing the hook-shaped gathering arms or bars 36 or 37 to drop on to the brush. By pulling the hand lever 43 forwardly, the hold down bar or gathering arm support provided by the bars 31 and 32, together with the bars 36 and 37 will be drawn forwardly over the ends of the supporting bars 23, pulling on to the supporting bars additional brush or hay. The gathering arms can be raised, moved rearwardly, allowed to fall, and then drawn forwardly several times if desired, to gather onto the supporting bars 23 as big a load as possible. When this is accomplished, the hand lever 26 is thrown rearwardly, raising the supporting bars 23 into the position shown in Figure 3. The lever is thrown rearwardly a sufficient distance so that the cranks 14 and 15 will swing through the position wherein they are in alignment with the links 16 and 17, so that the supporting bars will be maintained in the horizontal position as previously explained. When in this position, the pawls on the hand levers 39 and 43 are preferably released, and these hand levers are locked in such a position that the gathering arms 36 and 37 press downwardly on top of the load, serving as hold-down bars which hold the load in place while it is being transported.

From the above described construction it will be appreciated that a novel brush rake is provided having a plurality of parallel supporting bars adapted to be thrust into a pile of brush, and that in addition thereto, means is provided for assisting in gathering a load onto the supporting bars, which means serves to hold the load in place while being transported.

With the brush rake in the position of Fig. 1 the truck is backed toward the piles or winrow until the surface of the rake is loaded back to the truck frame and many times as high as gathering bars or arms 36 and 37.

Various changes in the details of construction may be made without departing from the spirit or scope of the invention as defined by the appended claims.

I claim:

1. A brush rake comprising a wheeled vehicle, a plurality of approximately horizontal bars adapted to be thrust into a pile of brush, and a plurality of hold-down bars arranged above said bars, and separate means for moving said hold-down bars toward the first mentioned bars to hold brush thereon, said hold-down bars having their ends curved in a hook-shaped manner.

2. A brush rake comprising a wheeled vehicle, a plurality of parallel approximately horizontal bars pivotally mounted upon said vehicle, separate means for moving said bars causing them to assume either a horizontal or a downwardly inclined position in which position they are adapted to be thrust into a pile of brush, and means carried by the vehicle adapted to be moved from the outer ends of the bars inwardly to pull brush onto said bars.

3. A brush rake comprising a wheeled vehicle, a plurality of approximately horizontal bars mounted upon the vehicle adapted to be thrust into a pile of brush, gathering means, links pivotally connected to the vehicle and to the gathering means, and separate means for moving said gathering means outwardly and inwardly adjacent the bars to pull brush onto them.

4. A brush rake comprising a wheeled vehicle, a plurality of approximately horizontal bars mounted upon the vehicle adapted to be thrust into a pile of brush, gathering means, links pivotally connected to the vehicle and to the gathering means, and separate means for moving said gathering means outwardly and inwardly adjacent the bars to pull brush onto them, said gathering means being formed of sections pivotally connected to each other, the outer sections having hook-shaped ends.

5. A brush rake comprising a wheeled vehicle, a plurality of approximately horizontal bars mounted upon the vehicle, a gathering arm support, links pivotally connected to the gathering arm support and to the vehicle, gathering arms having downwardly extending ends pivoted upon the support, a lever on the support, means connecting the gathering arms to the lever so as to be capable of being raised and lowered thereby, means for holding the lever in adjusted position, and means for holding the frame in adjusted position.

6. A brush rake comprising a wheeled vehicle, a plurality of approximately horizontal bars mounted upon the vehicle, a gathering arm support, links pivotally connected to the gathering arm support and to the vehicle, gathering arms having downwardly extending ends pivoted upon the gathering arm support, a lever on the gathering arm support, means connecting the gathering arms to the lever so as to be capable of being raised and lowered thereby, means for holding the lever in adjusted position, and means for holding the gathering arm support in adjusted position, the first mentioned bars being pivotally mounted upon the vehicle, and means for raising and lowering the bars and holding them in raised position.

7. A device of the class described, comprising a wheeled vehicle, means providing a support on the vehicle, a gathering arm support movably mounted upon the vehicle, gathering arms pivotally mounted upon the gathering arm support, means for raising and lowering the gathering arms, and means for moving the gathering arm support backwardly and forwardly upon the vehicle.

8. A brush rake comprising a frame, a plurality of approximately horizontal bars mounted upon said frame, a hold down bar supporting structure, links pivotally connected to the supporting structure and to the frame, means for moving the supporting structure back and forth, hold-down bars pivotally mounted upon the supporting structure, and means for raising and lowering the hold-down bars.

9. A brush rake comprising a frame, a plurality of approximately horizontal bars mounted upon said frame, a hold-down bar supporting structure, links pivotally connected to the supporting structure and to the frame, means for moving the supporting structure back and forth, hold-down bars pivotally mounted upon the supporting structure, and means for raising and lowering the hold-down bars, and means for locking the hold-down bars in any adjusted position.

In testimony whereof I have signed my name to this specification.

DAVIS R. GARRETSON.